United States Patent [19]
Cunningham

[11] 3,811,243
[45] May 21, 1974

[54] METHOD OF ASSEMBLING MULTI-PACKAGING DEVICES TO ARTICLES

[75] Inventor: Ernest R. Cunningham, Libertyville, Ill.

[73] Assignee: Grip-Pak Inc., St. Louis, Mo.

[22] Filed: Mar. 31, 1972

[21] Appl. No.: 240,041

[52] U.S. Cl............................ 53/30, 53/3, 53/35, 206/45.33, 206/46 R
[51] Int. Cl........................................... B65b 53/00
[58] Field of Search............ 229/87 R, 89, DIG. 12, 229/88; 206/45.33, 46 R, 65 C, 65 E, 65 S; 53/3, 26, 30, 35; 220/112, 113, 114, 116

[56] References Cited
UNITED STATES PATENTS
3,653,504 . 4/1972 Saumsiegle ..................... 53/26 X
2,933,866 4/1960 Cranston, Jr. ....................... 53/30 X

*Primary Examiner*—Andrew R. Juhasz
*Assistant Examiner*—W. D. Bray
*Attorney, Agent, or Firm*—Michael Kovac

[57] ABSTRACT

A method for assembling stretchable and elastic multi-packaging devices to articles is disclosed wherein the stretchable and elastic multi-packaging device is positioned over at least one pair of adjacent articles, the articles are moved apart from one another to stretch the multi-packaging device and allow at least one other article to be inserted therebetween, and the spaced apart articles are then released to allow the multi-packaging device to grip the articles together as a group.

5 Claims, 4 Drawing Figures

3,811,243

METHOD OF ASSEMBLING MULTI-PACKAGING DEVICES TO ARTICLES

SUMMARY OF THE INVENTION

The present invention relates to a method of assembling a flattened stretchable and elastic multi-packaging device, such as a flattened tubular device with or without an integral top, to a plurality of articles. In my prior patent application, Ser. No. 167,385 filed July 29, 1971, I have disclosed multi-packaging devices for gripping and holding articles together as a group in which the multi-packaging devices are made for stretchable and elastic plastic material and include a wraparound skirt which is adapted to be stretch mounted in elastic gripping engagement over the articles and an integral top which is adapted to over lie the articles. In my aforementioned patent application, I have also disclosed a method or technique for assembling such multi-packaging devices to articles wherein the wraparound skirt of the multi-packaging device is stretched to a peripheral dimension greater than the group of articles for telescopic mounting thereover, and then the wraparound skirt is released to cause the skirt to elastically embrace and hold the articles together as a group.

While the method or technique of assembling as disclosed in my aforementioned patent application is quite satisfactory, I have discovered a method or technique of assembling stretchable and elastic multi-packing devices which has a number of advantages over my prior method or technique of assembly.

Accordingly, it is an object of the present invention to provide a new and improved method or technique of assembling stretchable and elastic multi-packaging devices to articles.

More specifically, it is an object of the present invention to provide a method or technique for assembling stretchable and elastic multi-packaging devices to articles which provides uniform stretching of the multi-packaging device, allows more versatility and/or adaptability of the method to various sizes and shapes of articles, and requires a minimum number of procedural steps during the assembly operation.

These and other objects and advantages of the present invention are attained by the procedure of assembling a stretchable and elastic multi-packaging device to a plurality of articles including the steps of: positioning the stretchable and elastic multi-packaging device over at least one pair of adjacent articles, moving the articles apart from one another to stretch the multi-packaging device, inserting at least one article between each pair of spaced apart articles, and then releasing the spaced apart articles and causing the multi-packaging device to elastically grip the articles together as a group.

BRIEF DESCRIPTION OF THE PREFERRED EMBODIMENTS

The procedure of assembling stretchable and elastic film multi-packaging devices in accordance with the method or technique disclosed in my aforementioned patent application requires the stretching of the multi-packaging device to a peripheral dimension greater than the articles to be packaged followed by the telescopic assembly of the multi-packaging device to the articles in order to allow the multi-packaging device to embrace and grip the articles when released. According to the herein disclosed method or technique, the stretchable and elastic film multi-packaging device is first telescopically positioned over some of the articles to be packaged prior to the stretching of the multi-packaging device by moving the articles apart from one another to allow one or more other articles to be inserted between the spaced apart articles. Thereafter, the spaced apart articles can be released in order to permit the multi-packaging device to grip and hold the articles together as a group.

Having now presented a general description of the present invention, a more detailed description of the assembly method or technique of the present invention will now be described.

Figure 1:
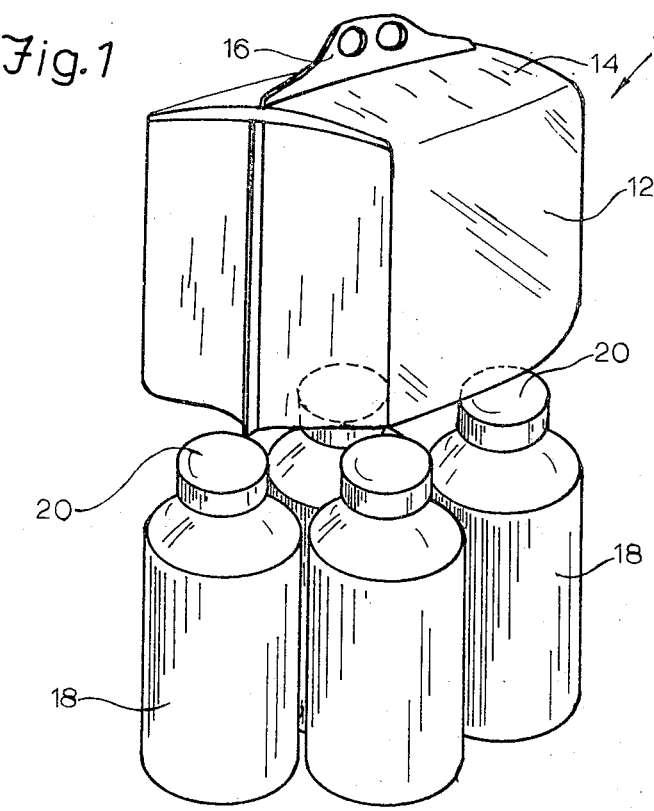
FIG. 1 is an exploded perspective view of a stretchable and elastic film multi-packaging device which is positioned over a plurality of articles.

As best seen in FIG. 1 of the drawing, the stretchable and elastic film multi-packaging device can preferably include a wraparound skirt 12 and a top 14 integrally connected therewith. A handle device 16 or other carrying means, such as finger hole openings, may also be used with the multi-packaging device, if desired.

The multi-packaging device 10 is preferably initially formed as a flattened tubular device which is subsequently opened to the position illustrated in FIG. 1 for assembly to the articles 18 here shown as bottles with closures 20 at the upper end thereof. While the present invention has particular application for multi-packaging devices of the type shown in FIG. 1, it will be appreciated from the ensuing discussion that the method or technique of the present invention may be usefully employed in assembling a stretchable and elastic tubular band of material without an integral top as provided in the multi-packaging device 10.

The multi-packaging device 10 or tubular band of material is made from a stretchable and elastic plastic material in order that it can be extended or drawn out by stretching, with or without deformation thereof, while also permitting the device to be returned to its former size or shape by elasticity. One preferred type of material which is stretchable, elastic and deformable is low-density polyethylene, although other types of materials which provide stretchability and elasticity, with or without deformation, may be used.

In order to assemble the multi-packaging device 10 to a plurality of articles 18, the first step in the method or technique of the present invention is the positioning of the multi-packaging device 10 over the articles 18 as shown in FIG. 1 of the drawing. Either before or at the time the multi-packaging device 10 is positioned over the articles 18, the multi-packaging device 10 can be opened up from a flattened to the open position illustrated in FIG. 1.

Figure 2:
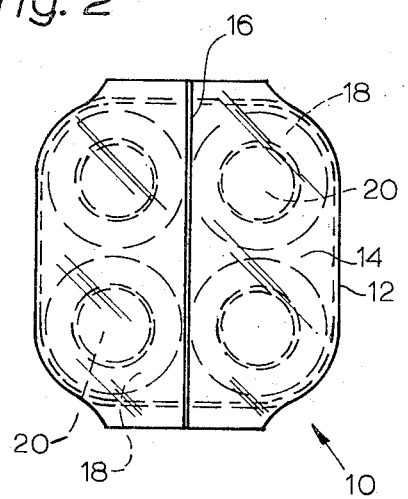
FIG. 2 is a top plan view of the multi-packaging device shown in FIG. 1 in telescopically mounted position over the plurality of articles.

Following the positioning of the multi-packaging device 10 relative to the articles 18, the multi-packaging device 10 can be telescopically assembled over the articles 18 as shown in FIG. 2 of the drawing. The peripheral dimension of the wraparound skirt portion 12 of the multi-packaging device 10 is such that when the multi-packaging device 10 is positioned over the articles 18 as illustrated in FIG. 2, there is no stretching of the wraparound skirt 12. Thus, the multi-packaging device 10 may be easily mounted over the articles 18 in loose fitting relationship thereto.

Figure 3:
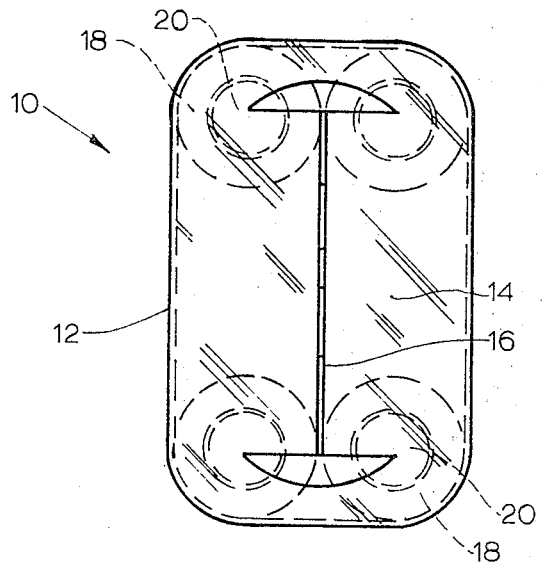
FIG. 3 is a top plan view illustrating the manner in which the multi-packaging device is stretched by the movement of pairs of articles apart from one another.
Figure 4:
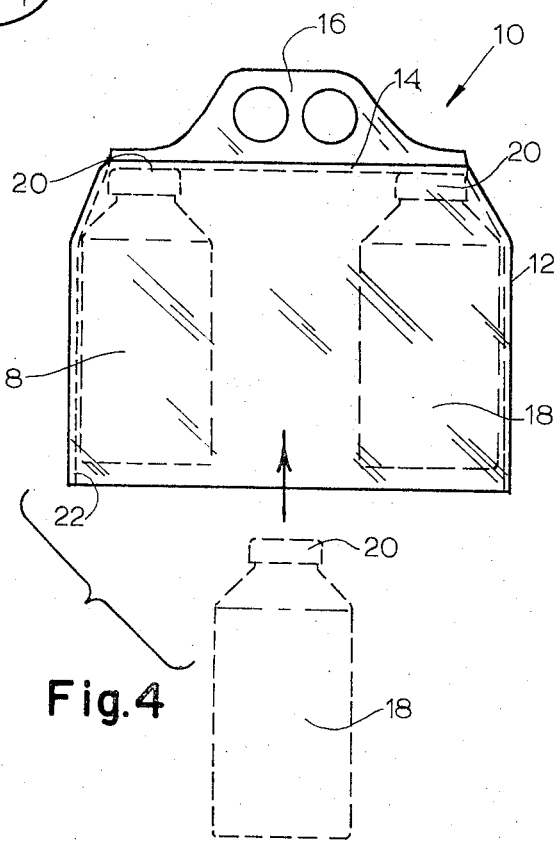
FIG. 4 is a side elevational view illustrating how intermediate articles are inserted between the spaced apart articles in order to allow the spaced apart articles to be released to allow the multi-packaging device to grip and hold the articles together as a group.

With the multi-packaging device 10 thus positioned over the articles 18, the multi-packaging device 10 is stretched by moving opposed pairs of articles 18 apart from one another, as shown in FIG. 3, by a distance which is large enough in order to insert an additional pair of articles 18 between the spaced apart opposed pairs of articles 18, as shown in FIG. 4. As soon as the intermediate articles 18 have been positioned between the opposed pairs of articles 18, the spaced apart articles 18 can be released to cause the wraparound skirt 12 to elastically embrace and grip the articles 18.

The top 14 of the multi-packaging device 10 may also be stretched and arranged to be brought into comformable engagement relative to the closures 20 of the articles. At the lower end of the wraparound skirt 12, a skirt extension 22 may be provided in order to underlie the articles 18 when the wraparound skirt 12 and the skirt extension 22 thereof is released to elastically embrace the sides and bottoms respectively of the articles 18.

The herein disclosed method or technique enables the wraparound skirt 12 of the multi-packaging device 10 to be uniformly stretched while permitting the wraparound skirt 12 to assume a contour fit relative to the articles 18 during stretching of the multi-packaging device 10. Thus, when the wraparound skirt 12 is released, after stretching thereof, the wraparound skirt 12 has essentially assumed its final configuration since the spacing between the articles 18 prior to release thereof is preferably relatively small in order to avoid breakage or damage to the articles 18. Also, by first mounting the multi-packaging device 10 over the articles 18 prior to stretching thereof, the top 14 and skirt extension 22 of the multi-packaging device 10 will be stretched and/or conformed to the upper and lower ends of the articles 18. Thus, the multi-packaging device 10 can be readily and completely assembled to the articles 18 in its desired position.

It will be appreciated that the present invention may be used where there is at least one pair of adjacent articles which can be moved apart from one another to stretch the multi-packaging device or tubular band for insertion of at least one other article therebetween. As a result, the multi-packaging device or tubular band may be assembled to and even or odd number of articles, as may be desired.

From the foregoing, it will now be appreciated that the present invention discloses a new and improved method or technique for assembling a multi-packaging device or tubular band to a plurality of articles wherein the assembly thereof is achieved with efficiency, completeness, and a minimum number of procedural steps.

I claim:

1. The method of assembling a stretchable and elastic band relative to a plurality of articles comprising the steps of: positioning the stretchable and elastic band over at least one pair of adjacent articles, moving the articles apart from one another to stretch the band, inserting at least one article between each pair of spaced apart articles, and releasing the spaced apart articles and causing the band to elastically grip the articles together as a group.

2. The method of assembling a stretchable and elastic carrier device relative to a plurality of containers, providing a stretchable and elastic tubular carrier which is dimensioned for mounting over at least one pair of adjacent containers in unstretched condition; positioning the carrier over at least one pair of adjacent containers, moving the containers apart from one another and stretching the tubular carrier, inserting at least one article between each pair of spaced apart containers, and releasing the spread apart containers and causing the tubular carrier to elastically grip the containers together as a group.

3. The method of assembling carrier devices to a plurality of articles arranged together as a group, each said carrier device being made of stretchable and elastic plastic material and having a top and a wraparound skirt whose circumference is substantially less than the outer dimension of said group of articles, comprising the steps of: telescopically mounting each carrier device over said group of articles, stretching the wraparound skirt of each carrier device to a peripheral dimension greater than the outer dimension of the group of articles by moving at least some of said group of articles in opposite directions, inserting at least one additional article between said spaced apart articles, and releasing the wraparound skirt of each carrier device by releasing the spaced apart articles to cause said skirt to elastically embrace and hold said articles together as a group.

4. The method as defined in claim 3 wherein the wraparound skirt of each carrier device has a length greater than the height of said articles and said method further includes the step of positioning the lower free end of the stretched wraparound skirt below the articles, whereby upon releasing the wraparound skirt, the lower free end thereof is in a position beneath and in contact with said articles.

5. The method as defined in claim 3 wherein said carrier device is made from lay flat tubing and said method includes the step of opening up the lay flat tubing prior to stretching the wraparound skirt thereof.

* * * * *